3,347,957
HIGH-IMPACT POLYPROPYLENE COMPOSITION CONTAINING ETHYLENE/CARBOXYLIC ACID SALT COPOLYMERS
Domas Adomaitis, Chicago, and Paul E. Sellers, Oak Forest, Ill., assignors to Continental Can Company, Inc., New York, N.Y., a corporation of New York
No Drawing. Filed June 18, 1965, Ser. No. 465,149
9 Claims. (Cl. 260—897)

ABSTRACT OF THE DISCLOSURE

An isotactic polypropylene composition of improved impact resistance comprised of a homogenous blend of the polypropylene with an alkali metal neutralized ethylene/acrylic acid copolymer.

---

This invention is directed to high-impact polypropylene and more particularly to a method of improving the impact resistance of polypropylene. Still more specifically, this invention is directed to a polypropylene composition and to a method of improving the impact resistance by incorporating therein effective amounts of an alkali metal-containing ionic copolymer. With the continuous development of the polyolefins and their widespread use, particularly polypropylene, it has become necessary to improve on the mechanical characteristics of these polymers so that they can be utilized for preparing various articles of commerce including films, fibers, sheets, bottles and other containers for packaging of such items as foodstuffs, cosmetics, deodorants, medicinals, oils, and the like.

Generally, polyethylene has been used for such purposes because of its relative inertness, structural strength and flexibility even at low temperatures. Moreover, polyethylene is easily fabricated in commercial quantities at reasonable cost and is, therefore, highly desirable as a packaging material. Similarly, polypropylene, including the more recently developed isotactic polypropylene, is useful for preparing containers, e.g., plastic bottles, but suffers a disadvantage in that it has poor low temperature properties. Thus, while polypropylene has many advantages in the packaging and container field, it is necessary to improve its low temperature characteristics, particularly its impact resistance. Heretofore attempts to improve the impact resistance, in most instances, were achieved at the expense of clarity and, therefore rendered the product unsuitable for commercial purposes. It has been discovered, however, that it is possible to improve the impact resistance and the low temperature characteristics of polypropylene while maintaining the clarity of the polymer by homogeneously blending polypropylene with a metal-containing ionic copolymer. A homogeneous blend of the ionic copolymer and polypropylene can be obtained by subjecting a mixture of the two polymeric materials to a kneading action at a pressure of at least 500 pounds p.s.i.

Heretofore, small amounts of chemically inert but physically active inorganic compounds have been kneaded into olefin polymers to obtain blends having improved impact resistance and other morphological properties, such as internal cohesion, abrasion resistance and the like. While these additions improved the polymers' morphological characteristics, they were not sufficient to improve the polymers' resistance to pinch crazing. It is important, particularly in preparing plastic pitch-bottles or the like, to utilize a material which has a quick deformation recovery and a high-resistance to pinch crazing. Thus, it has been found that by blending an ionic copolymer into polypropylene, under the conditions set forth in accordance with this invention, it is possible to obtain a blend which is not only improved with respect to pinch craze, but also and more important, has an impact strength substantially better than polypropylene. Moreover, the rheological properties of the polymeric blend are such that the composition may be extruded and blow-molded without any difficulty and with the ease and reproducibility normally encountered with either polyethylene or polypropylene. The modified polypropylene compositions of this invention are commercially valuable in that thin panels of the material may be molded into side walls or end walls of container bodies and will not pinch craze upon being stacked in packaging cases or dropped on hard surfaces. The polymeric blend can be used to form intricate and indented bottom seamed configurations in blow-mold containers which require a strong resistance to breakage, particularly when used for commercial household containers.

Accordingly, it is an object of this invention to provide a high-impact resistant polymeric composition and more particularly a polypropylene composition containing an effective amount of a metal-containing ionic copolymer.

It is another object of this invention to provide a high-impact polymeric composition comprising polypropylene and effective amounts of an ionic copolymer which may be used in preparing various plastic containers including squeeze bottles having a high resistance to pinch crazing.

It is still another object of this invention to provide a polymeric composition consisting essentially of polypropylene and an ionic copolymer which may be used for preparing plastic bottles and other containers exhibiting good morphological properties.

It is still a further object of this invention to provide a polymeric composition to be used in preparing clear, plastic bottles having high-impact resistance and improved low temperature characteristics.

It is still a further object of this invention to provide a modified polypropylene composition particularly useful for the preparation of clear, plastic bottles and similar containers which are impermeable, exhibit good morphological properties at low temperatures and retain the degree of stiffness required of high quality bottles.

It is still a further object of this invention to provide a method of improving the impact resistance of polypropylene by homogeneously incorporating therein an ionic copolymer consisting essentially of the reaction product of an olefin and an unsaturated monocarboxylic acid.

It is still a further object of this invention to provide a method of improving the impact resistance of polypropylene by homogeneously dispersing a metal-containing ionic copolymer into the polypropylene by kneading the mixture at a pressure of at least 500 pounds p.s.i.

It is still a further object of this invention to provide a method of improving the impact resistance of polypropylene while maintaining the clarity of the polymeric composition by homogeneously dispersing a metal-containing ionic copolymer into the polypropylene by utilizing pressures of at least 500 pounds p.s.i. at a temperature near the melting point of the olefin.

It is still a further object of this invention to provide a method of improving the morphological properties of polypropylene and more particularly for improving the impact resistance of polypropylene by incorporating therein an effective amount of a metal-containing ionic copolymer by utilizing temperatures approaching the melting point of the olefin and pressures of at least 500 pounds p.s.i.

It is still a further object of this invention to provide a method of preparing thin-walled high-impact resistant containers including clear, plastic bottles which comprises subjecting a mixture of polypropylene and a metal-containing ionic copolymer to pressures of at least 500 pounds p.s.i. to obtain a homogeneous composition which may be used on conventional extruding machines.

These and other objects of the invention will become apparent from a further and more detailed description of the invention to follow.

It has been discovered, quite unexpectedly, that the impact resistance of polypropylene and other morphological properties, particularly the low temperature properties, can be improved by incorporating in the polypropylene effective amounts of a metal-containing ionic copolymer. The improved polymeric composition is obtained from a mixture consisting essentially of 70–99% by weight of a polypropylene and 1–30% by weight and more preferably 1–20% by weight of an alkali metal-containing ionic copolymer. The polymeric mixture is formed into a homogeneous blend by kneading the composition at a pressure of at least 500 pounds p.s.i. and more preferably at a pressure of about 800–2,000 pounds p.s.i at a temperature at approximately the melting point of the polypropylene. The metal-containing ionic copolymer used to improve the morphological or mechanical properties of the polymeric composition can be characterized as a copolymer of an olefin having 2–10 carbon atoms per molecule and an unsaturated monocarboxylic acid selected from the group consisting of acrylic and methacrylic acid wherein at least 10% and more preferably 50–80% of the carboxylic acid groups are neutralized with an alkali metal ion.

More particularly, the metal-containing ionic copolymer used as the modifier for polypropylene can be characterized as the reaction product between ethylene or an alpha olefin and an ethylenically unsaturated monocarboxylic acid selected from the group consisting of acrylic and methacrylic acid wherein at least 10% of said carboxylic acid groups are neutralized by an alkali metal ion.

In preparing the ionic copolymer, the olefin ranges from about 80–99 mole percent with the unsaturated monocarboxylic acid ranging from about 1–20% and more preferably from about 1–10 mole percent. The olefins, or ethylene, and more specifically the alpha olefins, may be characterized by the general formula $RCH=CH_2$, wherein R is a radical selected from the group consisting of hydrogen and alkyl radicals having from 1–8 carbon atoms per molecule. This includes ethylene and olefin monomers such as propylene, butene-1, pentene-1, heptene-1, hexene-1, 3-methyl-butene-1, 4-methyl pentene-1, octene-1, etc.

The olefins are preferably copolymerized with either acrylic acid or methacrylic acid wherein the acid may range up to about 20 mole percent but more preferably is present in the copolymer in an amount ranging from about 1–10 mole percent. The base copolymers are converted to ionic copolymers by reacting the copolymer with an ionizable alkali metal compound. This reaction or neutralization with the alkali metal ions is sufficient at least to neutralize 10% of the carboxylic acid groups and more preferably 35–80% of the acid groups.

The base copolymers used in preparing the ionic copolymers of this invention may be prepared in a number of different ways as particularly pointed out in the current literature. A preferred method, however, particularly in preparing copolymers utilizing ethylene as a monomer, is to introduce the monomers into a polymerization reactor at pressures ranging up to 3,000 atmospheres and at temperatures of about 150–300° C. in the presence of a free radical polymerization initiator, such as a peroxide, and an inert organic solvent. The ionic copolymers are obtained by neutralizing at least 10% of the carboxylic acid groups with an ionizable metal compound including the alkali metal formates, acetates, hydroxides, alkoxides, i.e., sodium methoxide, ethoxides, nitrates, carbonates, etc.

A typical example of preparing the ionic copolymers consists essentially of milling approximately a 500-gram sample of an ethylene-methacrylic acid copolymer containing about 10 mole percent by weight of methacrylic acid to the mill temperature and then adding thereto about 24 grams of sodium methoxide, dissolved in about 100 mls. of methanol. The sodium methoxide was added to the copolymer over a period of about 5 minutes as the copolymer was worked on the mill. The blending of the composition was continued for approximately 15 minutes during which time the initially soft, fluid melt became stiff and rubbery. The resulting product may be characterized as having a melt index of less than 0.1 gram/10 minutes, and was transparent.

The change of properties resulting from the neutralization or the conversion of the copolymer to the ionic copolymer is influenced by the degree of neutralization. Therefore, although the solid state properties of the copolymer are noticeably improved with even a small percentage of the acid groups being neutralized, in general it has been observed that a noticeable improvement is obtained after about 10% of the acid groups have been neutralized. In general, it has been found that the base copolymers having molecular weights, as measured by the melt index, of about 1 to 5 grams per minute and a carboxylic acid concentration of about 5 to 10% exhibit optimum solid state properties upon having 50–80% of the acid groups neutralized. The degree of neutralization may be decreased as the molecular weight of the copolymer base is increased.

The polypropylene modified by the addition of the ionic copolymer includes isotactic polypropylene which is characterized as a linear, head-to-tail, crystalline polymer wherein at least for long portions of the main chain all of the asymmetric carbon atoms have the same steric configuration. The polymer of propylene is obtained by polymerizing the monomer with the aid of a catalyst obtained by mixing a catalytic heavy metal compound such as titanium tetrachloride and a metal alkyl compound such as aluminum triethyl in a solvent such as a saturated aliphatic hydrocarbon.

The product obtained by the polymerization is usually a mixture which comprises both amorphous and crystalline polymers which can be separated by fractional dissolution. The polypropylene polymerizate, for example, comprising some low molecule weight products, is subjected to successive extractions with acetone, ether and boiling n-heptane to obtain the semi-solid to solid amorphous polymers, partially crystalline polymers, and highly crystalline polymers. The various polymers, depending on their steric structure and molecular weight, exhibit different characteristics. Both of these polymers, however, are linear as demonstrated by their infrared spectra. The highly crystalline high-molecular polypropylenes are insoluble in boiling n-heptane. At temperatures above the transition temperature, at which the crystalline state disappears, these highly crystalline polyproylenes do not change directly into a flowing fluid but retain the characteristics of an amorphous plastic. Consequently, they can be readily processed at a temperature somewhat higher than the temperature at which the crystalline structure disappears by methods normally used for extruding or injection-molding of other known plastic compositions. Thus, various shaped articles, including sheets, foils, etc., may be produced from the propylene polymerizates without necessarily separating the amorphous polymers from the crystalline polymers.

Typical examples of the ionic copolymer modified polypropylene compositions, in the form of four-ounce cylinder bottles is illustrated by the data in the following table.

TABLE I

| | Bottle Composition | | Failures, Room Temp., 68° F. | |
|---|---|---|---|---|
| | Percent Polypropylene | Percent Ionic Copolymer | Bottle (grams) Avg. Wt. | Feet Failure Height |
| 0 | [1] 100 | 0 | 11.8 | 6.9 |
| 1 | 99 | 1.0 | 11.9 | 8.1 |
| 2 | 97.5 | 2.5 | 12.7 | 7.9 |
| 3 | 95 | 5.0 | 12.6 | 7.4 |
| 4 | 90 | 10 | 12.9 | 9.4 |
| 5 | 85 | 15 | 13.6 | 7.6 |
| 6 | 80 | 20 | 14.1 | 7.5 |

[1] Control.

The four-ounce cylinder bottles were made on a Blow-O-Matic extruder and subjected to the impact test to determine the number of feet from which the bottles could be dropped before failing. The bottles were also evaluated with respect to their appearance, i.e., clarity, and other mechanical characteristics and found to be completely satisfactory for commercial use.

The data in Table I was obtained by extruding the four-ounce cylinder bottles on a Blow-O-Matic extruder at a melt temperature of about 375° F. and at a gate pressure of about 1,050 p.s.i. Pellets of the composition were preblended and fed into the extruder at a screw speed of about 16 r.p.m. However, as the amount of copolymer blended with the polypropylene was increased from 10 to 30%, the screw speed was likewise increased to about 28 r.p.m. in order to maintain a constant feed and pressure. Micrographs of the side walls of the bottles at 100 magnification were obtained by using polarized, transmitted light. These micrographs indicated that in ranges of 1 to 5%, the ionic copolymer disappears in the polypropylene and there was no marked change on the micrographs. Starting with 10%, however, a second phase appears on the micrographs of the virgin bottles which was contributed to the roughness of the particle dispersion. This second phase, however, indicative of approximately 20% of the ionic copolymer, tends to disappear on regrinding the composition under the same conditions for one or more times. The clarity of the bottle prepared at normal extrusion speeds was exceptionally good in that there was practically no difference between the control and the polypropylene modified bottles. More important, none of the bottles showed any delamination or crazing upon being sharply bent and had a recovery release comparable to the controls.

Various conventional equipment may be used to interknead and mix the polymeric components of this invention and include laboratory extruders, open roll mills, Blow-O-Matic extruding, blow-molding machines, Dulmage screw extruders, Banbury mills and the like. To obtain a suitable volumetric flow rate for bottle blowing and other uses, the operating pressures in the extruder may vary up to 5,000 pounds p.s.i. while effecting the necessary interkneading. The temperatures utilized will depend primarily upon the softening point or melting point of the polypropylene. At these temperatures the olefin polymer is sufficiently plastic so that the ionic copolymer can be homogeneously blended with the polypropylene without any difficulties.

A number of bottles were prepared by mixing approximately 5% by weight of a sodium-containing ionic copolymer with 95% by weight of polypropylene. The ingredients were placed into the hopper of a metering-type screw extruder which was operated at a temperature of about 375° F. and a pressure of about 1,050 pounds p.s.i. The composition was used to prepare four-ounce bottles on a Blow-O-Matic apparatus in a conventional manner wherein the blow-molding apparatus grips and closes the end of an extruded tube. The gripping takes place at a distance corresponding to the desired length of the bottle while surrounding the tube section is the mold which determines the shape. A gas is blown into the gripped and otherwise closed mouth end of the bottle so that the side walls are expanded into the conformity of the mold. The extruded tubing was approximately 0.10 inch in thickness with the molding die being 0.5 inch in diameter with a core of 0.35 inch diameter. The complete cycle for molding a single bottle is approximately 23–35 seconds. A number of these clear bottles were filled with water at room temperature and subjected to a drop test as indicated in Table II.

TABLE II

| | Bottle Composition | | Color | Average Impact Resistant Failure Height, ft. |
|---|---|---|---|---|
| | Percent Polypropylene | Percent Ionic Copolymer | | |
| 1 | [1] 100 | 0 | Clear | 5.0 |
| 2 | 95 | 5 | do | 8.7 |

[1] Control.

The molded bottles were filled with water, capped and dropped from various heights to determine the impact resistance, particularly of the bottom pinch seams. The bottles were dropped from a continuing height until breakage occurred. The average failure height of 8.7 feet was recorded for a polypropylene composition containing only 5% of the ionic copolymers. In comparison, the unmodified polypropylene bottles failed at 5 feet. The ionic copolymer was the reaction product of about 97 mole percent of ethylene and about 4 mole percent of acrylic acid wherein about 38% of the acid groups were neutralized with sodium ions. Thus, it can be seen that the ionic copolymer substantially improves the impact resistance of the blow-molded bottles in comparison to the unmodified bottles.

The polymeric modified composition of this invention is also compatible with various other additives including pigments, dyes, with no change or alteration in the resistance to pinch crazing or any of the other favorable morphological properties. In addition, the surface of the modified polymer may be printed on in a conventional manner with known ink compositions and, therefore, is particularly useful for preparing many commercial articles which require improved impact resistance, particularly at lower temperatures.

While this invention has been described with respect to a number of specific embodiments, it is obvious that there are other modifications and variations which can be resorted to without departing from the spirit of the invention except as more particularly pointed out in the appended claims.

What is claimed is:

1. A high-impact resistant polymeric composition consisting essentially of a homogeneous blend of about 70–99% by weight of isotactic polypropylene and about 1–30% by weight of an alkali metal-containing ionic copolymer; said ionic copolymer consisting of the reaction product obtained by the free radical polymerization of about 80–99 mole percent of 1-monoolefin containing 2–10 carbon atoms per molecule and about 1–20 mole percent of at least one unsaturated monocarboxylic acid selected from the group consisting of acrylic acid and methacrylic acid wherein at least 10% of the carboxylic acid groups of the copolymer are neutralized with an alkali metal ion.

2. The high-impact resistant polymeric composition of claim 1 further characterized in that the alkali metal-containing ionic copolymer is present in the polypropylene in an amount ranging from about 2–15% by weight.

3. The high-impact resistant polymeric composition of claim 1 further characterized in that the ionic copolymer is the reaction product of 90–99 mole percent of ethylene and 1–10 mole percent by weight of the unsaturated monocarboxylic acid.

4. The high-impact resistant polymeric composition of claim 3 further characterized in that approximately 35–40% of the carboxylic acid groups of the copolymer are neutralized with sodium.

5. The high-impact resistant polymeric composition of claim 4 further characterized in that the unsaturated monocarboxylic acid is acrylic acid.

6. The composition of claim 1 further characterized in that approximately 50–80% of the carboxylic acid groups are neutralized with an alkali metal.

7. The composition of claim 6 further characterized in that the alkali metal is sodium.

8. A high-impact resistant polymeric composition consisting essentially of a homogeneous blend of 80–99% by weight of isotactic polypropylene and 1–20% by weight of an alkali metal-containing ionic copolymer; said ionic copolymer consisting of the reaction product obtained by the free radical polymerization of about 96 mole percent by weight of ethylene and about 4 mole percent by weight of an unsaturated monocarboxylic acid selected from the group consisting of acrylic and methacrylic acids wherein approximately 35–40% of the carboxylic acid groups of the copolymer are neutralized with sodium.

9. The composition of claim 8 further characterized in that the unsaturated monocarboxylic acid is acrylic acid.

References Cited
UNITED STATES PATENTS

| | | | |
|---|---|---|---|
| 2,953,541 | 9/1960 | Pecha et al. | 260—897 |
| 3,127,234 | 5/1964 | O'Neill | 260—897 |
| 3,248,359 | 4/1966 | Maloney | 260—897 |
| 3,249,570 | 5/1966 | Potts et al. | 260—897 |
| 3,265,771 | 8/1966 | Ray et al. | 260—897 |

FOREIGN PATENTS 87,132  9/1964  India.

GEORGE F. LESMES, *Primary Examiner.*

MURRAY TILLMAN, *Examiner.*

T. G. FIELD, *Assistant Examiner.*